Oct. 4, 1932.  I. L. LINDLEY  1,880,323

STORAGE BATTERY

Filed Sept. 20, 1929  2 Sheets-Sheet 1

Inventor:
Irma L. Lindley
By Monroe E. Miller
Attorney.

Oct. 4, 1932.  I. L. LINDLEY  1,880,323

STORAGE BATTERY

Filed Sept. 20, 1929  2 Sheets-Sheet 2

Inventor:
Irma L. Lindley
By Monroe E. Miller
Attorney.

Patented Oct. 4, 1932

1,880,323

UNITED STATES PATENT OFFICE

IRMA L. LINDLEY, OF LAUREL, MISSISSIPPI

STORAGE BATTERY

Application filed September 20, 1929. Serial No. 394,039.

The present invention relates to storage or secondary batteries, and aims to provide a novel and improved battery structure which will enable convenient separation of the component elements for purpose of inspection, renewal or replacement.

Another object of the invention is the provision of a battery having novel connections between the electrode plates of the companion cells, to provide for convenient assembly and separation of the structure.

A further object of the invention is the provision of novel means for closing and sealing the battery cells.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
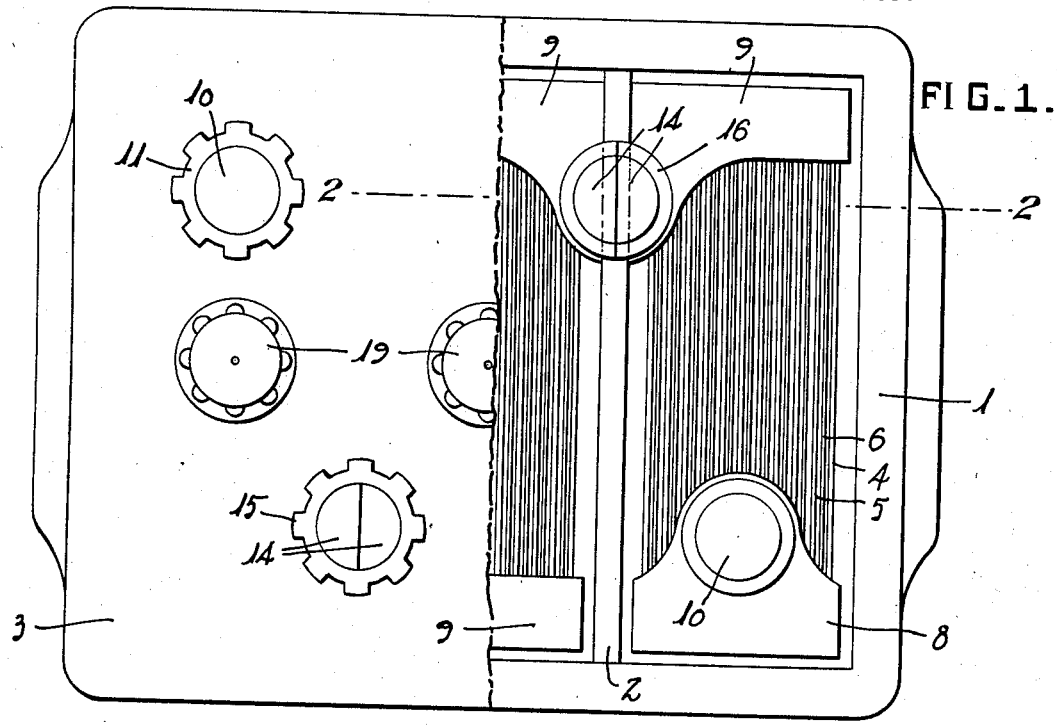
Figure 1 is a plan view of the improved battery, portions being broken away.
Figure 3:
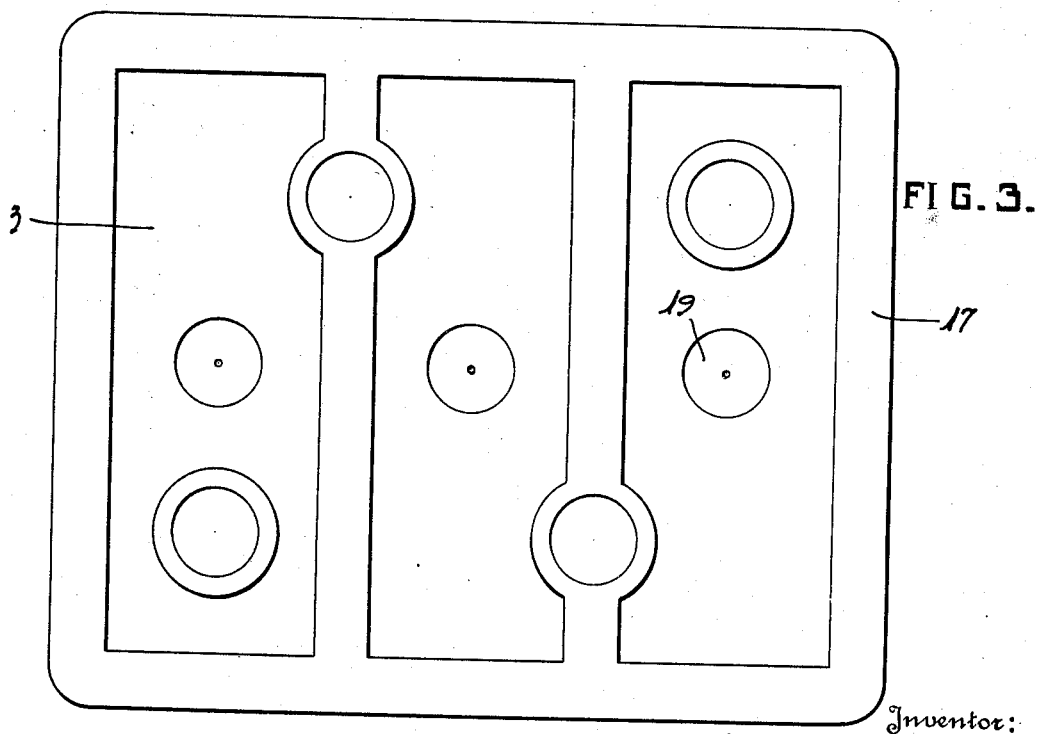
Fig. 3 is a bottom view of the cover or top.
Figure 2:
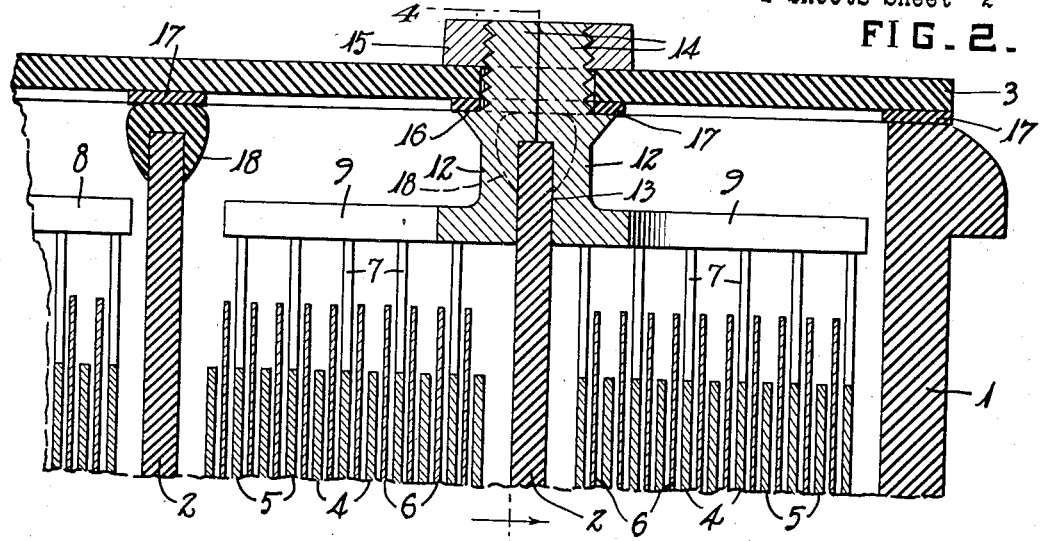
Fig. 2 is an enlarged section on the line 2—2 of Fig. 1.
Figure 4:
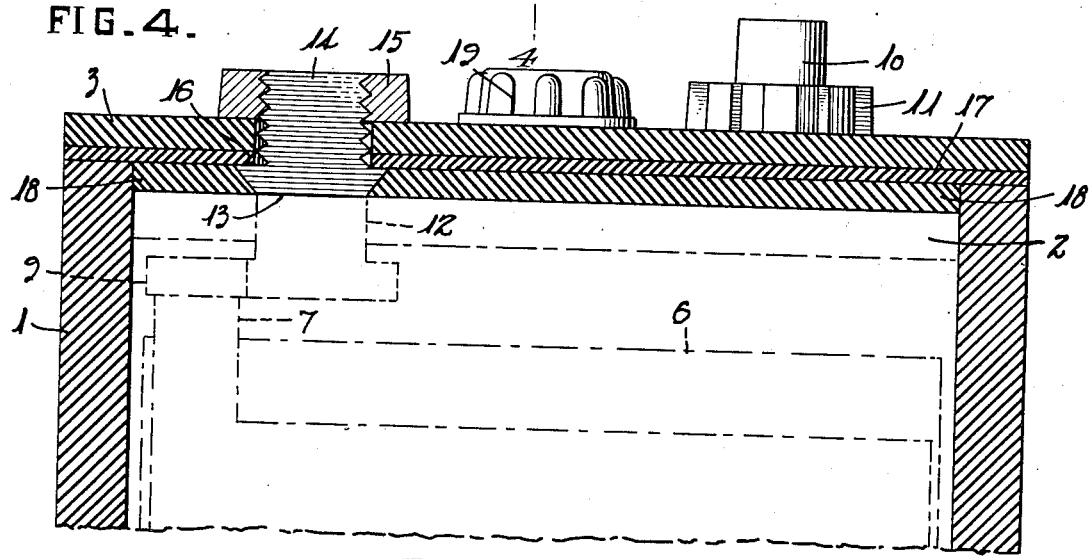
Fig. 4 is a section on the line 4—4 of Fig. 2.
Figure 5:
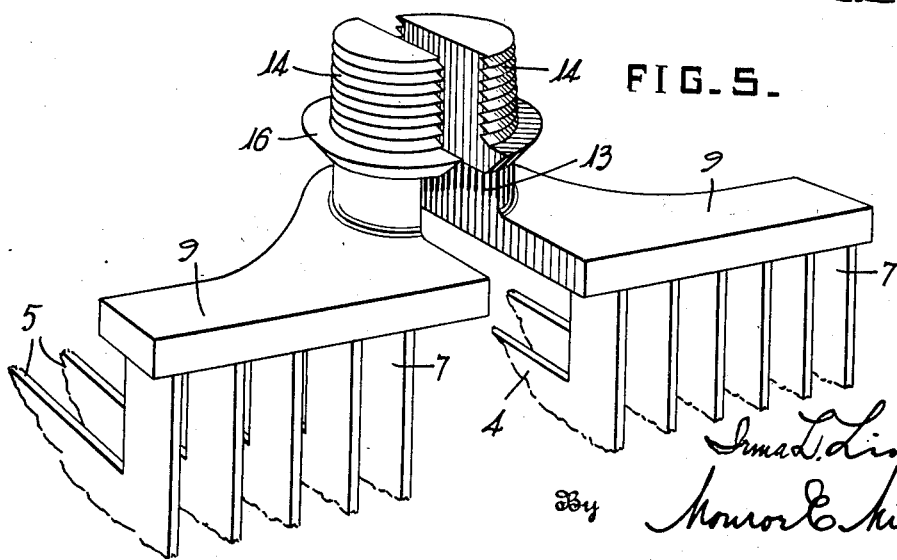
Fig. 5 is a perspective view of one of the pairs of members for connecting the electrode plates of adjacent cells, showing said members separated.

The battery comprises a suitable case 1 of rubber, glass or other suitable material, having the partitions 2 therein dividing the case into cells.

It is preferable to provide a single cover or top 3 for closing all of the cells, although individual closures for the cells may be used according to well known practice.

The positive and negative electrode plates 4 and 5 are disposed as usual in the cells, with separators 6 between them, and said plates are provided with the upstanding shanks or necks 7.

Said shanks of the electrode plates at the opposite ends of the series are brazed or otherwise secured to terminal members 8, while the shanks of the other electrode plates are similarly secured to yoke members 9.

The terminal members 8 have upstanding posts 10 passing through apertures in the cover, and nuts 11 are threaded on said posts, and said posts constitute the terminals of the battery for the connection of the electrical conductors.

The yoke members 9 are arranged in pairs at the opposite sides of the partitions 2 and their adjacent ends abut said partitions. Said adjacent ends of the members 9 have the post sections 12 rising therefrom and complementing one another. The post sections 12 have their confronting surfaces recessed, to provide slots 13 to snugly receive the partitions 2, whereby the posts or coupling portions 12 fit astride the partitions.

The portions 12 have complementary screw-threaded portions 14 rising therefrom and passing through apertures in the cover, and nuts 15 are threaded on the portions 14. Said threaded portions are tapered so that when the nuts are threaded thereon the portions 12 and 14 are clamped together, thereby providing good electrical contacts between the members 9, as well as clamping said members on the partitions 2.

The portions 12 have shoulders 16 below the threaded portions 14 to contact with a gasket or packing 17 of soft rubber or other suitable material secured or disposed against the lower surface of the cover and adapted to seat on the rim of the case 1 and over packing strips 18 fitted over the upper edges of the partitions 2.

The packing strips 18 are of rubber or other suitable material and are of inverted U-shaped cross section so as to fit astride the partitions. Said packing strips 18 extend from the side walls of the case 1 to and are fitted against the portions 12, so as to prevent leakage or splashing from one cell to the adjacent cell.

With the electrode plates and separators fitted tightly in the cells, and the portions 12 clamped over the partitions 2, the nuts 11 and 15 will hold the cover 3 down in place, although, if desired, any suitable means may be used in addition for clamping the cover down on the case.

The present assembly enables the battery to be readily dis-assembled for inspection, repair or replacement, the cover being readily lifted off when the nuts 11 and 15 are removed from the posts. This will permit each group of electrode plates to be removed from the corresponding cell, the removal of the nuts 15 and cover 3 from the posts 12—12 detaching said posts and the corresponding members 9, so that the two sets of electrode plates which are normally connected are disconnected for separation and assembly.

Having thus described the invention, what is claimed as new is:

A battery comprising a case having cells and a partition between them, a cover for the case, groups of electrode plates in said cells, yoke members secured to the groups of said plates on opposite sides of said partition, said members having post sections complementing one another to form a longitudinally split screw threaded shank and extending upwardly through said cover, said post sections having recesses forming a slot receiving said partition and having shoulders under the cover, and a nut screw-threaded on said post sections above the cover to clamp said post sections together and to clamp the cover between said nut and shoulders.

In testimony whereof I hereunto affix my signature.

IRMA L. LINDLEY.